S. R. KELLY.
PAN LIFTER.
APPLICATION FILED MAY 26, 1909.
963,774.
Patented July 12, 1910.
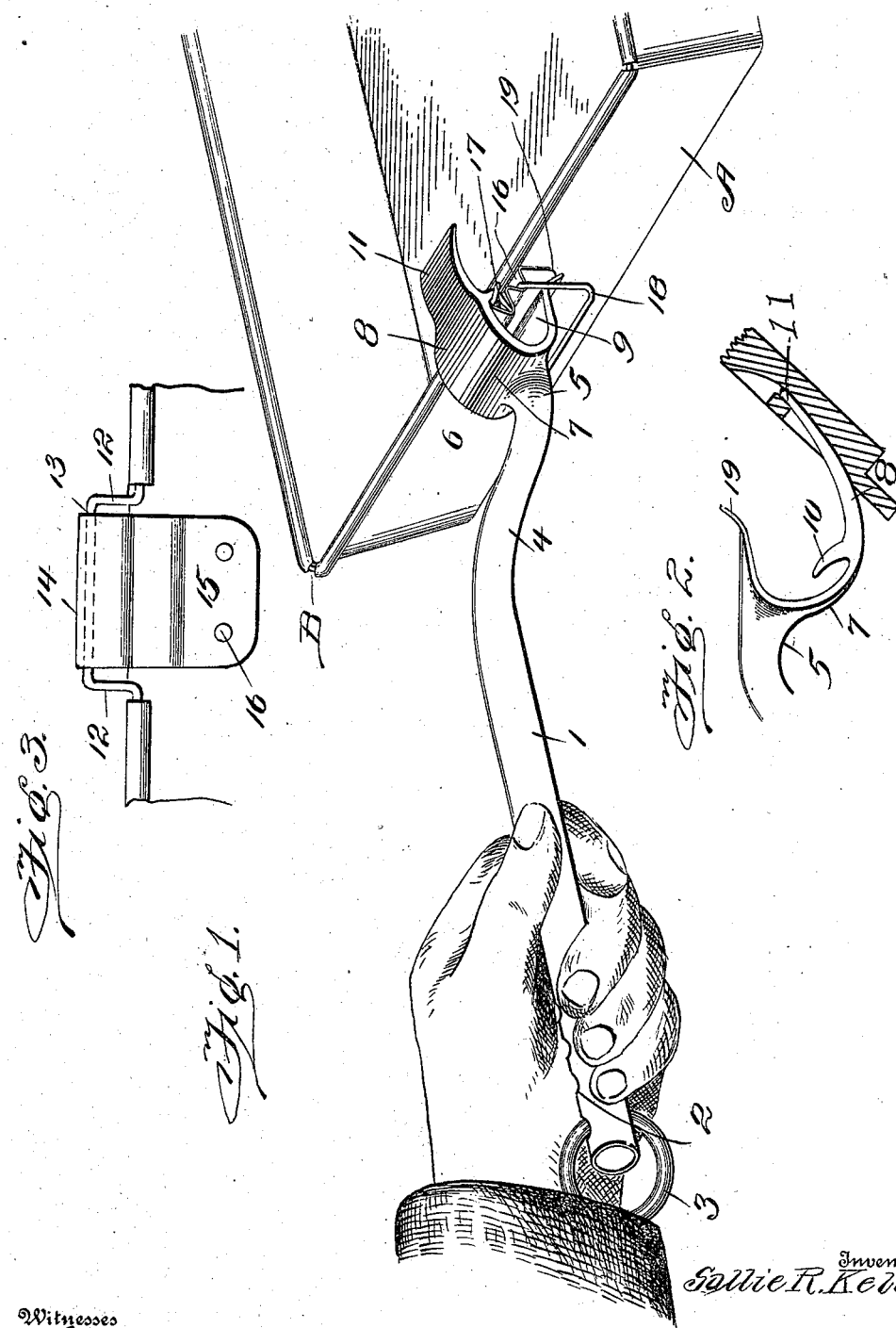

UNITED STATES PATENT OFFICE.

SALLIE RUTH KELLY, OF WELLINGTON, TEXAS.

PAN-LIFTER.

963,774.

Specification of Letters Patent. Patented July 12, 1910.

Application filed May 26, 1909. Serial No. 498,499.

*To all whom it may concern:*

Be it known that I, SALLIE RUTH KELLY, a citizen of the United States, residing at Wellington, in the county of Collingsworth and State of Texas, have invented new and useful Improvements in Pan-Lifters, of which the following is a specification.

This invention relates to pan lifters, and has for an object to provide a device of this character adapted to be engaged with a pan whereby the latter can be conveniently lifted and held out of engagement with the hands of the operator.

A still further object of my invention is to provide a pan lifter having a novel and simple form of stove door opener, a portion of the said device being arranged to serve as a fulcrum during the opening operation of the door.

Other objects and advantages will be apparent as the nature of the invention is better set forth, and it will be understood that changes within the scope of the claims may be resorted to without departing from the spirit of the invention.

In the drawing, forming a portion of this specification and in which like numerals of reference indicate similar parts in the several views:—Figure 1 is a perspective view of a pan lifter showing its application to a pan. Fig. 2 is a detail inverted side elevation of a portion of the lifter. Fig. 3 is a detail end view of a portion of the pan having means adapted for coöperation with my improved lifter.

Referring now more particularly to the drawing, my improved pan lifter comprises a handle 1 of hollow form preferably which is provided adjacent to the hand gripping end with a plurality of ventilating passages 2, one of said passages receiving a ring or supporting member 3 whereby the device can be hung upon a suitable support when not in use. The outer end of the handle 1 is curved downwardly as shown at 4 and forwardly as shown at 5, the last named portion of which being provided with a head 6. The head 6 is provided with a curved inner portion 7 which carries an outwardly curved jaw 8 and an outwardly extending flat jaw 9. The jaw 8 has formed integrally therewith an angularly disposed downwardly directed lip 10 which is provided for a purpose to be hereinafter described. The jaw 8 is also provided with an outwardly extending claw 11 which is adapted to be engaged in the eye of a stove lifter whereby the latter can be lifted in a novel manner.

A pan of rectangular form is shown at A, the walls of the said pan being crimped around a reinforcing wire B. At one of the end walls of the pan the reinforcing wire B is bent to provide upwardly directed spaced arms 12 connected to each other by a portion 13 which is disposed away from the upper edge portion of said end wall and as shown this portion has crimped therearound the upper edge 14 of a member 15. The member 15 is secured by means of rivets or suitable fastening devices to the end wall of the pan and as shown the said member is corrugated to provide horizontally disposed grooves or sockets 16 and 17. The socket 16 receives a pivoted supporting bail 18 adapted to be connected with a suitable support when it is desired to hang the pan to a wall or the like.

In operation, when it is desired to lift the pan the handle 1 of the lifting device is directed upwardly at an angle and the lip 10 is inserted in the socket 17 of the member 15, after which the handle 1 is moved downwardly so that the jaw 9 is forced into engagement with the end wall of the pan. In order that the pan can have a broad point of engagement with the jaw 9 I provide the latter with a downwardly directed lip 19 as clearly shown in Fig. 1 of the drawing. After the parts of the device have been thus adjusted it will be readily understood that the pan can be lifted from place to place without having to bring the hands of the operator of the device in touch with any portion of the pan. When the lip 10 is in its operative position it will be seen that the end portions thereof lie between the portions 12 of the reinforcing wire, and these portions thus serve as means to prevent casual displacement of the said lip. The jaw 9 is also of such form as will permit its side edges to lie between the vertical portions of the bail 18 which also serves as means to prevent casual displacement of the device from the pan.

I claim:—

1. As a new article of manufacture, a pan lifter comprising a handle having a head at one end, upper and lower spaced jaws upon the said head, a downwardly extending lip carried by the upper jaw, and an outwardly extending claw carried by the upper jaw and extended beyond the outer end of the lower jaw.

2. The combination with a pan having a member secured thereto upon one of its walls, said member having a plurality of sockets formed therein, a pivotally mounted bail having a portion engaged in one of the sockets, of a lifter comprising a handle having a head at one end provided with a plurality of spaced jaws, a lip carried by one of the jaws adapted for engagement in one of the sockets formed in said member, and a second lip disposed beneath the first named lip and adapted to have its side edges confined between the side portions of the bail, the outer extremity of said jaw being adapted for frictional engagement with one of the walls of the pan.

3. In combination with a pan having its walls beaded at their outer edges, a reinforcing wire engaged in said beaded portion of the walls, said wire having upwardly extending arms disposed between the ends of one of the walls of the pan, said wire having a portion connecting the arms at their outer extremities, a member secured to the pan, said member having its upper edge crimped to the connecting portion of said arms, said member having a socket disposed beneath the said connecting portion, of a lifter comprising a handle having a head at one end, said head having a pair of spaced jaws, a lip carried by one of the jaws adapted for engagement in the socket formed in said member and a lip carried by the other jaw adapted for frictional engagement with said pan.

In testimony whereof I affix my signature in presence of two witnesses.

SALLIE RUTH KELLY.

Witnesses:
F. T. KELLY,
G. C. CURTNER.